Patented Mar. 10, 1942

2,276,164

UNITED STATES PATENT OFFICE 2,276,164

PREPARATION OF POLYTHIOAMIDES FROM THIOLACTAMS

Norman L. Cox, Claymont, and William E. Hanford, Wilmington, Del., assignors to E. I. du Pont de Nemours & Company, Wilmington, Del., a corporation of Delaware No Drawing. Application February 9, 1940, Serial No. 318,198

12 Claims. (Cl. 260—2)

This invention relates to the preparation of polythioamides.

This invention has as an object the provision of a process for making polythioamides, more particularly polymeric amides of primary mono-aminomonocarbothionic acids. A further object is the preparation of new polythioamide interpolymers. Another object is the preparation of materials of use in the manufacture of films, fibers, filaments, coating compositions, molding compositions, etc. Other objects will appear hereinafter.

These objects are accomplished by the following invention wherein a thiolactam containing at least seven annular atoms is heated in the presence of a thioamide-splitting catalyst to form a linear polythioamide.

In the process of the present invention, a suitable thiolactam

and a catalyst (either alkali metal, water or other thioamide-splitting agent) are heated in a sealed evacuated vessel to a temperature of from 180° to 250° C. The heating schedule is determined by (1) the number of annular atoms in the thiolactam (2) temperature and (3) choice of catalyst. As the number of atoms in the cyclic thioamide is increased, polymerization takes place more rapidly. For example, the conversion of the nine-membered thiolactam is effected in 24 hours with sodium as the catalyst, or 48 hours with water, whereas the conversion of the eight-membered thiolactam requires several days at the same temperature. A two-hour schedule for $\omega$-thioheptanolactam at 250° C. produced a polymer of approximately the same degree of polymerization as several days at 180° C.

It is preferable to use at least 1/10 mol of water or 1/100 mol of alkali metal per mol of cyclic thioamide. When sodium is used as catalyst, is is better to carry out the initial reaction at a relatively low temperature (approx. 100–120° C.) to avoid charring. As soon as the sodium has disappeared the temperature may be raised to operating temperature. Sodium metal catalyst has been shown to materially shorten the time necessary to effect a satisfactory degree of polymerization. After the heating schedule has been completed and the product cooled, it may be used without further treatment or it may be freed from the residual monomer by distilling off the latter at low pressures. The polymers formed by this process are characterized by their rubbery properties which are maintained up to their melting points which are usually over 200° C.

In addition to the formation of straight, i. e., simple, polymers, the thiolactam method lends itself readily to the preparation of interpolymers, for example, by subjecting a mixture of two or more thiolactams to polymerization conditions. Of particular interest are the interpolymers obtained from mixtures of thiolactams with their oxygen analogs, the lactams. In general, interpolymerization of a thiolactam with $\epsilon$-caprolactam and other oxygen analogs of larger ring size is carried out in the manner described in the previous paragraph. With $\epsilon$-caprolactam and $\epsilon$-thiocaprolactam (in proportions of 4:1 in particular) slightly - colored, high - melting polymers containing as high as 3.0% sulfur can be obtained by heating with water as catalyst at 180° for 150 hours. If a higher temperature is used, excessive decomposition occurs. The resulting tough product, which melts in the range 150–200°, is insoluble in mixtures of methanol and chloroform. If a larger proportion of $\epsilon$-thiocaprolactam is used, the product is less tough and may even be brittle. Very satisfactory products are obtained with thiolactams containing more than 7 annular groups since these lactams are not so susceptible to thermal decomposition. These interpolymers constitute, so far as is known, the highest molecular weight polymers containing thioamide units, as shown by intrinsic viscosity determinations.

The more detailed practice of the invention is illustrated by the following examples, wherein parts given are by weight. There are of course many forms of the invention other than these specific embodiments.

*Example I*

One part of $\omega$-thioheptanolactam,

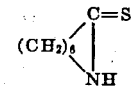

and 0.0125 part of water are sealed in a glass tube and heated at 180° for 7 days. The product, upon cooling to room temperature, sets up to a reddish-brown polymer. This product possesses thermoelasticity above room temperature, melts at 235° C. and has an intrinsic viscosity over 0.3 in m-cresol.

By "intrinsic viscosity" as applied to the polymers of certain of the examples, is meant the mathematical quotient $$\frac{\log_e Nr}{C}$$

where Nr is the viscosity of a dilute (e. g., 0.5%) solution of the polymer in a suitable solvent (e. g., m-cresol) at a convenient temperature (e. g., 25° C.) divided by the viscosity of the same solvent in the same units at the same temperature, and C is the concentration in grams of polymer per 100 cc. of solution.

Example II

One part of ω-thioheptanolactam is heated with 0.005 part of metallic sodium in a closed vessel at 180° for seven days. The product obtained in this experiment is a viscous resin which softens below room temperature. Its intrinsic viscosity is over 0.3 in m-cresol.

Example III

A sealed evacuated tube containing 1 part of ω-thioheptanolactam and 0.003 part of sodium is heated at 250° C. for 2 hours. The resulting polymer is a plastic mass which hardens on standing in contact with air to a thermoplastic rubbery product. Its toughness can be improved by further heating under reduced pressure.

Example IV

To 0.5 part of ω-thiocaprylolactam

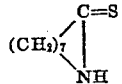

in a tube is added 0.005 part of water; the tube is evacuated to 5 mm. pressure and sealed while being cooled in an acetone-solid carbon dioxide bath, and is then heated to 180° C. for 48 hours. On cooling, a slightly colored solid is obtained, which has more toughness and less elasticity than that of the preceding example.

Example V

A mixture of 0.5 part of ω-thiocaprylolactam and 0.004 part of sodium is heated at 180° in a closed vessel in the usual manner. After 24 hours the product sets up to a thick gel. The heating is continued for a total of 48 hours. The product is rather soft when first examined, but on standing in air it becomes so hard as to be difficultly deformed with the fingers. The solid softens above room temperature and maintains its elastic properties up to 300° C., at which point it melts.

Example VI

ε-Thiocaprolactam

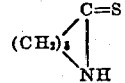

and a trace of $BF_3.3H_2O$ complex are heated in a sealed evacuated tube at 180° for 72 hours. The tube is cooled down to room temperature and the contents removed without attempting to drive off the residual monomer under reduced pressure. The product is a somewhat colored material which flows to the shape of its container. It possesses a certain elasticity. Its molecular weight can be increased by further heating under reduced pressure but remains probably lower than that of the polymers derived from thiolactams containing more than seven annular atoms.

Example VII

A mixture of 0.5 part of ω-thioheptanolactam, 2.0 parts of ε-caprolactam, and 0.005 part of sodium is heated at 250° in an evacuated, sealed reactor for 150 hours. An elastic rubbery polymer is obtained which melts at 96° C. Its intrinsic viscosity is 0.38 in m-cresol.

Example VIII

A mixture of 9.0 parts of ε-caprolactam,

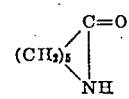

1.0 part of ε-thiocaprolactam and 0.162 part of water (1 part of water to 10 parts of lactam based on combined weight) is heated in an evacuated, sealed reactor for 144 hours at 170° C. The resulting polymer is then heated for 3 hours at 250° under reduced pressure. A cream-colored solid with melting point 212° C. and sulfur content of 0.55% is obtained. This material has a very high molecular weight as shown by its intrinsic viscosity of 1.23 in m-cresol, is insoluble in mixtures of chloroform and methanol, and can be pressed into tough, water-resistant films.

Example IX

To 8 parts of ε-caprolactam in a tube are added 2.0 parts of ε-thiocaprolactam and 0.16 part of water. The tube is evacuated, sealed and heated at 180° C. for 120 hours, at which temperature its contents are solid. The product is further heated under vacuum at 220° C. for 3 hours to remove the monomer. A cream-colored solid, melting at 207° C., containing 2.75% sulfur and having an intrinsic viscosity of 0.85 in m-cresol is obtained. Recrystallization from hot formamide or phenol does not change the sulfur content, indicating that interpolymerization had occurred. This product is insoluble in mixtures of methanol and chloroform and can be pressed into tough films.

In the process of the present invention, any thiolactam containing at least seven annular atoms can be polymerized using alkali metals, water, or any other amide- or thioamide-splitting catalyst. The thiolactams polymerizable by this process include ε-thiocaprolactams, ω-thioheptanolactam, methyl thiocaprolactam, ω-thiocaprylolactam, 3-methyl thiocaprylolactam, ω-thiononanolactam, 4-methylthiononanolactam and its other substituted products, and ω-thiodecanolactam. These thiolactams may be obtained by any known method, as, for example, the rearrangement of the corresponding cyclic ketoximes with sulfuric acid and subsequent reaction of the lactam (isoxime) with phosphorus pentasulfide. ε-Thiocaprolactam is prepared more conveniently by heating ε-aminocapronitrile under pressure in alcohol saturated with hydrogen sulfide, as disclosed in Pinkney U. S. Patent 2,201,200 issued May 21, 1940, on copending application Serial No. 199,988.

This process is also applicable to the polymerizations of di(thiolactams) of the formula $$\begin{array}{c} H \quad S \\ N-C \\ R \quad \quad R' \\ N-C \\ H \quad S \end{array}$$

wherein R and R' represent divalent hydrocarbon radicals, i. e., hydrocarbon chains containing at least two carbon atoms each. These di(thiolactams) are exemplified by

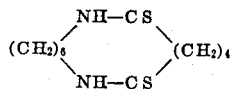

which may be obtained by treating with phosphorus pentasulfide, the corresponding oxygen compound, itself obtained as a by-product in the manufacture of polymeric hexamethyleneadipamide. The polymers prepared from these di(thiolactams) contain a mixture of recurring units in which the chains R and R' may be of the same or different lengths.

In the present process wherein a thiolactam is rearranged, there may be employed mixtures of thiolactams, of thiolactams with lactams, and of thiolactams with cyclic esters, such mixtures comprising in effective amount a thiolactam of at least seven annular atoms. Thus the invention is applicable to the production of interpolymers such as those obtained by heating together ε-caprolactam and ε-thiocaprolactam. Any lactam, i. e., cyclic amide of at least seven annular atoms may be employed including those derived by rearrangement with sulfuric acid of the oximes of cyclohexanone, methylcyclohexanone, cycloheptanone, cyclooctanone, cyclopentadecanone and cyclohexadecanone.

Likewise any cyclic ester, i. e., lactone of at least six annular atoms may be used, including caprolactone, heptanolactone, caprylolactone, lactone of ω-hydroxymyristic acid, etc.

The quantity of water used as amide-splitting agent in carrying out the polymerization is at least 0.1 mol per cent based on the thiolactam. Quantities of water considerably in excess of this lead to excessive degradation, while less than 0.1 mol of water is insufficient to give ready polymerization. The preferred proportions of sodium metal as catalyst lie in the range 0.01 to 0.04 mol per mol of thiolactam. A temperature range of 160 to 260° C. may be used. A short heating schedule at 250° C. is usually as effective as a long heating schedule at 180° C.; however, the latter conditions are preferred, since high temperatures may give excessive decomposition. Other amide- or thioamide-splitting agents in carrying out the process of this invention can be used; namely, acetic acid, ethanol, methanol, ammonium hydroxide, aqueous mineral acids, boron trifluoride and others; alkali and alkaline earth metals such as lithium or calcium may be used. However, the temperature and heating time must be regulated according to the effectiveness of the catalyst. Available data indicate that the ease of polymerization improves with increase in the number of annular atoms present in the cyclic compound.

The polymerizations and interpolymerizations may be conducted either in closed, evacuated vessels or in open vessels in the presence of an inert gas such as nitrogen. Polymerizations with water or other volatile catalyst must be carried out in sealed reactors to retain the catalyst, at least until a sufficient degree of polymerization is reached. The product at the end of the heating schedule is usually a rubbery, sometimes slightly colored, polymer which shows some tendency to adhere to glass.

The products of the process of this invention are linear polymeric secondary amides derived from monoaminomonocarbothionic acids. They have a plurality of

units in which R is a substituted or unsubstituted chain so that the radical length of each unit is at least seven. The radical length of a monoaminomononitrile is the length of the chain between and including the amino nitrogen and the cyano carbon. The radical length of the polymer derived from a thiomonolactam corresponds to the number of annular atoms.

The products of the invention are the interpolymeric polythioamides containing the reaction residues of a plurality of thiolactams or of at least one thiolactam with at least one lactam and/or lactone by applying the process of this invention to a mixture of at least one thiolactam with at least one other thiolactam or at least one lactam or at least one lactone or a mixture thereof. They may be described as interpolymeric polythioamides of monoaminomonocarbothionic acids containing a plurality of recurring units —HN—R—CS—, wherein R contains a chain of at least five atoms, the interpolymeric polythioamides also being characterized in that they contain a plurality of recurring units selected from the class of the reaction residues of the thiolactams —HN—R¹—CS—, lactams

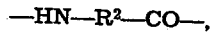

and lactones —O—R²—CO—, wherein R¹ is different from R and R² may be R or R¹.

The examples disclose the preparation of polymers or interpolymers of radical lengths of 7, 8, and 9, but the process of the invention is generic to the preparation of polythioamides derived from primary monoaminomonocarbothionic acids of the formula H₂N—R—CS—OH, wherein R is a substituted or unsubstituted bivalent organic radical attached to the amino nitrogen by aliphatic carbon having a chain between and including the amino nitrogen and the thiocarbonyl carbon of at least seven, including the polythioamides which may be considered as derived from the following amino acids: ω-aminocaproic acid, ω-aminocaprylic acid, ω-aminononanoic acid, ω-aminoheptadecanoic acid, 12-aminooctadecanoic acid, p-aminomethylbenzoic acid, p-aminomethylhydrocinnamic acid, 10-aminodecanoic acid, 2-methyl-6-aminohexoic acid, 6-methyl-6-aminohexoic acid, γ-amino-γ'-carboxydipropyl ether and the like, as well as carbon substituted derivatives of the above. Unsaturated amino acids may be used. Completely aliphatic amino acids are preferred and of these the saturated acids are more desirable.

The polymers and interpolymers of the present invention may be used in the production of fibers, filaments, films and molding and coating compositions. Their rubbery properties make them particularly valuable for some applications, e. g., as modifying agents in polyamide resins to impart flexibility. The polythioamides of this invention are also valuable as light- and oxygen-stabilizing agents in polyamides. The interpolymers are characterized by their high intrinsic viscosity, indicative of high molecular weight. Films obtained therefrom are resistant to water.

The above description and examples are intended to be illustrative only. Any modification of or variation therefrom which conforms to the spirit of the invention is intended to be included within the scope of the claims.

What is claimed is:

1. Linear interpolymeric secondary amides of primary monoaminomonocarbothionic acids having a recurring structural unit —NH—R—CS— wherein R is a divalent hydrocarbon radical having a chain length of at least five, and wherein the valence attached to nitrogen stems from aliphatic carbon, and further characterized by having a recurring structural unit of the class consisting of the reaction residues —NH—R$^1$—CS— of different thiolactams, the reaction residues —NH—R$^2$—CO— of lactams, and the reaction residues —O—R$^2$—CO— of lactones, R$^1$ and R$^2$ being divalent hydrocarbon radicals, R$^1$ being different from R.

2. A linear interpolymeric secondary amides of primary monoaminomonocarbothionic acids having a recurring structural unit —NH—R—CS— wherein R is a divalent aliphatic hydrocarbon radical having a chain length of at least five, and further characterized by having a recurring structural unit of the class consisting of the reaction residues —NH—R$^1$—CS— of different thiolactams, the reaction residues —NH—R$^2$—CO— of lactams, and the reaction residues

—O—R$^2$—CO— of lactones, R$^1$ and R$^2$ being divalent aliphatic hydrocarbon radicals, R$^1$ being different from R.

3. Linear interpolymeric secondary amides of primary monoaminomonocarbothionic acids having a recurring structural unit —NH—R—CS— wherein R is a divalent saturated aliphatic hydrocarbon radical having a chain length of at least five, and further characterized by having a recurring structural unit of the class consisting of the reaction residues —NH—R$^1$—CS— of different thiolactams, the reaction residues

—NH—R$^2$—CO— of lactams, and the reaction of residues

—O—R$^2$—CO— of lactones, R$^1$ and R$^2$ being divalent saturated aliphatic hydrocarbon radicals, R$^1$ being different from R.

4. Linear interpolymeric secondary amides of primary monoaminomonocarbothionic acids having a recurring structural unit —NH—R—CS— wherein R is a polymethylene radical having a chain length of at least five, and wherein the valence attached to nitrogen stems from aliphatic carbon, and further characterized by having a recurring structural unit of the class consisting of the reaction residues —NH—R$^1$—CS— of different thiolactams, the reaction residues

—NH—R$^2$—CO— of lactams, and the reaction residues

—O—R$^2$—CO— of lactones, R$^1$ and R$^2$ being polymethylene radicals, R$^1$ being different from R.

5. Linear interpolymeric secondary amides of primary monoaminomonocarbothionic acids having a recurring structural unit —NH—R—CS— wherein R is a divalent hydrocarbon radical having a chain length of at least five, and wherein the valence attached to nitrogen stems from aliphatic carbon, and further characterized by having a recurring structural unit NH—R$^1$—CS of a different thiolactam, R$^1$ being a divalent hydrocarbon radical different from R.

6. Linear interpolymeric secondary amides of primary monoaminomonocarbothionic acids having a recurring structural unit —NH—R—CS— wherein R is a divalent hydrocarbon radical having a chain length of at least five, and wherein the valence attached to nitrogen stems from aliphatic carbon, and further characterized by having a recurring structural unit —NH—R$^2$—CO— of a lactam, R$^2$ being a divalent hydrocarbon radical.

7. The interpolymer of ε-aminocaproic acid and ε-aminothiocaproic acid.

8. Linear interpolymeric secondary amides of primary monoaminomonocarbothionic acids having a recurring structural unit —NH—R—CS— wherein R is a divalent hydrocarbon radical having a chain length of at least five, and wherein the valence attached to nitrogen stems from aliphatic carbon, and further characterized by having a recurring structural unit

—O—R$^2$—CO— of a lactone, R$^2$ being a divalent hydrocarbon radical.

9. Process for preparing linear polymeric secondary thioamides which comprises heating a thiolactam of at least seven annular atoms and containing, apart from thiolactam sulfur and nitrogen, only carbon and hydrogen with an amide-splitting catalyst until a linear polymer is obtained and isolating the polymer.

10. Process for preparing linear polymeric secondary thioamides which comprises heating a thiolactam of at least seven annular atoms and containing, apart from thiolactam sulfur and nitrogen, only carbon and hydrogen with an amide-splitting catalyst under pressure at 180–250° C. until a linear polymer is obtained and isolating the polymer.

11. Process of claim 9 wherein metallic sodium is used as the catalyst, the reaction being conducted at 100–120° C. until the sodium is used up and thereafter at 180–250° C.

12. Process for preparing linear polymeric secondary thioamides which comprises heating a thiolactam of at least seven annular atoms and containing, apart from the thiolactam nitrogen and sulfur, only carbon and hydrogen with a lactam of at least seven carbon atoms and containing, apart from the lactam oxygen and nitrogen, only carbon and hydrogen and with an amide splitting catalyst under pressure at 180–250° C. until a linear polymer is obtained and isolating the polymer.

NORMAN L. COX.
WILLIAM E. HANFORD.